March 13, 1951 — T. C. POULTER — 2,545,380
SEISMIC EXPLORATION EMPLOYING ELEVATED CHARGES
Filed June 3, 1950 — 5 Sheets-Sheet 1
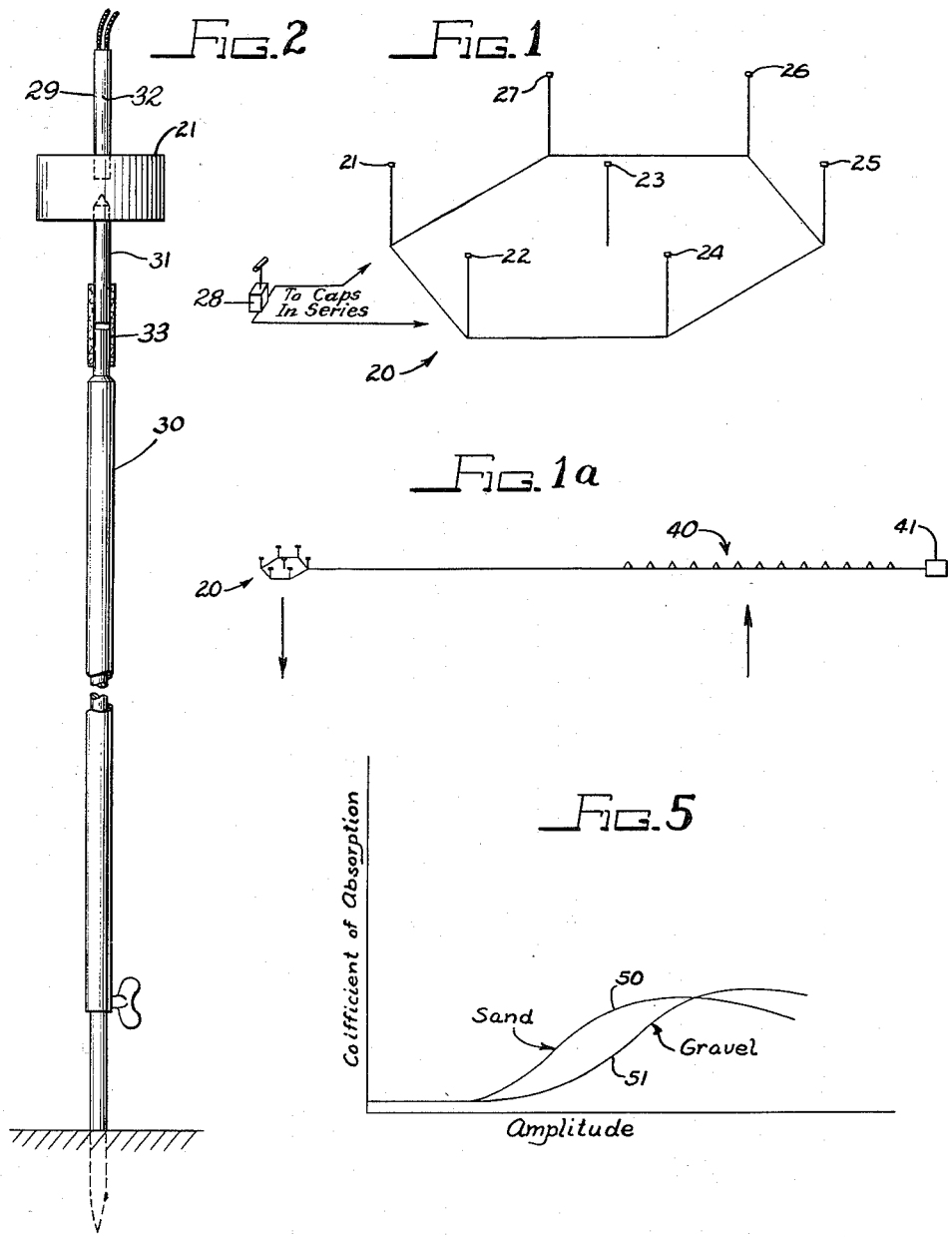
Inventor
Thomas C. Poulter
by: Carlson, Pitzner, Hubbard & Wolfe
Attys.

March 13, 1951  T. C. POULTER  2,545,380
SEISMIC EXPLORATION EMPLOYING ELEVATED CHARGES
Filed June 3, 1950  5 Sheets-Sheet 2
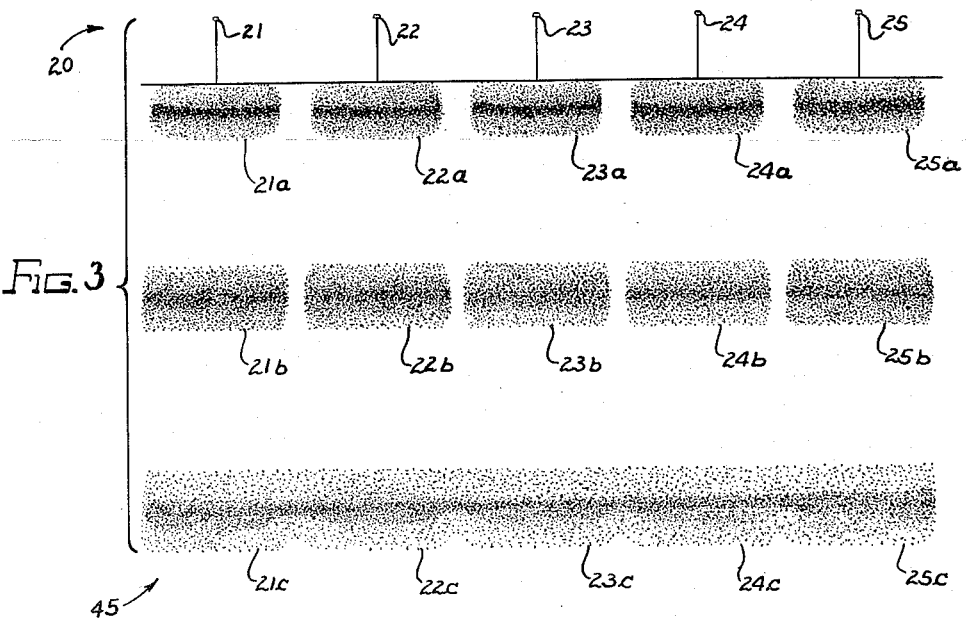
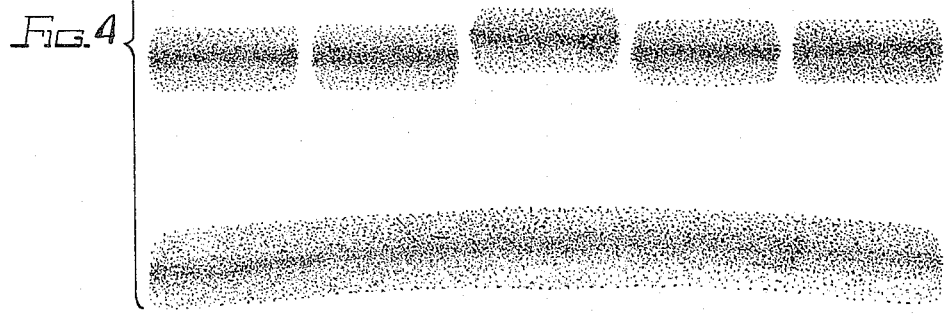
Inventor
Thomas C. Poulter
by: Carlson, Pitzner, Hubbard & Wolfe
Attys.

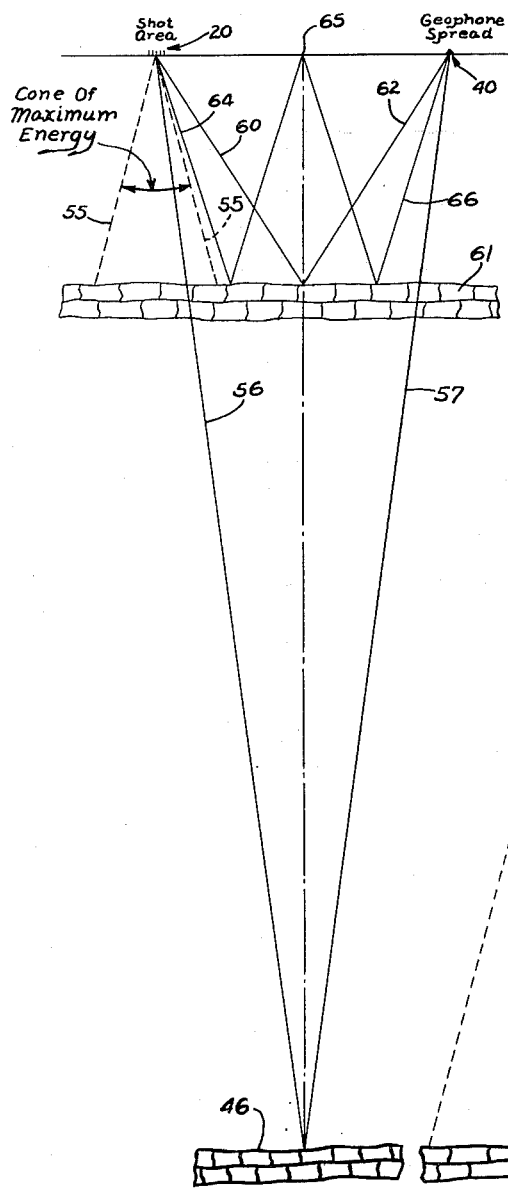

March 13, 1951 T. C. POULTER 2,545,380
SEISMIC EXPLORATION EMPLOYING ELEVATED CHARGES
Filed June 3, 1950 5 Sheets-Sheet 4

Inventor
Thomas C. Poulter

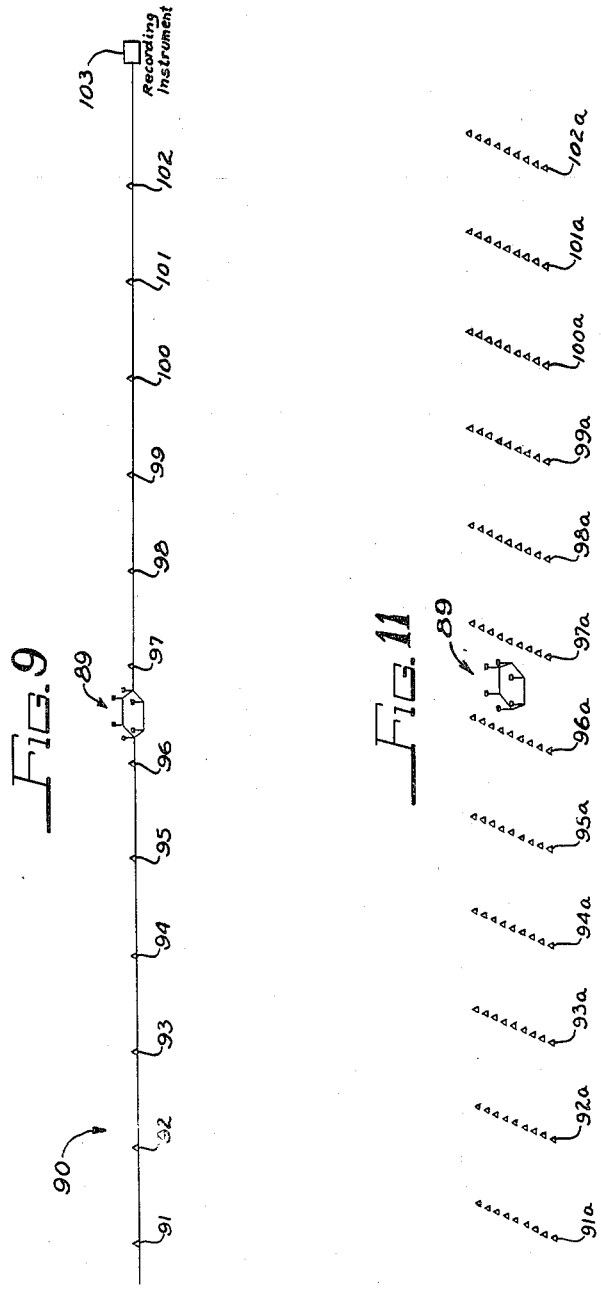

Patented Mar. 13, 1951

2,545,380

UNITED STATES PATENT OFFICE 2,545,380

SEISMIC EXPLORATION EMPLOYING ELEVATED CHARGES

Thomas C. Poulter, Palo Alto, Calif., assignor to Institute of Inventive Research, San Antonio, Tex., a trust estate Application June 3, 1950, Serial No. 166,052

7 Claims. (Cl. 181—.5)

The present invention relates to geophysical exploration and more particularly to the formation of an improved seismic wave for obtaining seismic reflections from submerged horizons.

In geophysical exploration and particularly in prospecting for oil it is necessary to locate domes and other significant structures quickly and with reasonable accuracy even when such structures exist at great depths and in spite of the weathered surface layer and local pecularities of earth structure which tend to inhibit the passage of and distort the wave front. For many years the conventional manner of setting up a seismic disturbance in the earth has been to dig one or more shot holes which may be up to several hundred feet in depth for the purpose of exploding a charge below the weathered layer. Perhaps the most obvious disadvantage of hole shooting is that shot holes have to be drilled, which is a particularly slow and expensive process where layers of hard rock must be penetrated. In addition, heavy drill rigs and other equipment must be brought in which makes the drilling of shot holes impracticable, for example in swampland and in remote parts of foreign countries where access is difficult. Then too, the exploding of one charge frequency causes the shot hole to cave in necessitating redrilling before another shot may be fired. Even the use of an expensive casing does not prevent such caving in. More importantly, successively shots in the same hole often produce records which differ considerably from one another making accurate confirmatory shots impossible.

Even where steps are taken to minimize the above difficulties following the teachings of the prior art, good records are not consistently obtainable using a shot hole. It can be shown that most of the explosive energy is dissipated by the crushing effect upon the surrounding rock structure and the transmitted energy fans outwardly in all directions resulting in what is known as the "inverse square loss." Additional energy is dissipated to increase background noise and otherwise confuse the record by reason of the "hole blow" which sets up spurious high frequencies and "ground roll" which consists of a low frequency "heaving" of the earth.

Using conventional shot hole techniques a complete spectrum of frequencies is produced and it is impossible to effectively control the frequency. Instead, the predominant frequencies are dependent entirely upon such unrelated factors as the nature of the rock structure surrounding the charge, depth of the charge in the earth, degree of tamping, size of charge, and the like.

As will be more fully pointed out herein, using a shot hole, regardless of its depth, frequently results in multiple reflections between relatively shallow layers and the earth's surface which tends to obscure useful information on the geophone record and to invite misinterpretation.

While all of the disadvantages of hole shooting have not been appreciated by those skilled in the art, attempts have been made to alleviate certain of them by firing a concentrated charge in the air. For example, the reissue Letters Patent 17,242 and Letters Patent 1,675,121 and 1,724,495, all of which were issued to McCollum, describe the firing of a single charge considerably elevated above the earth. While the so-called McCollum method was given considerable attention at the time the patents were issued, it was found that many regions refused to yield any usable records at all to users of the McCollum techniques, and that where any records were obtained, they were, for the most part, greatly inferior to the records obtainable by employing a conventional shot hole. The reason for this is believed to be the distribution of energy over an extremely large area resulting in the setting up of extraneous reflections and reverberations from regions in the earth which are not of interest thereby tending to confuse the record. In addition, the records are very difficult to interpret because it is not possible to determine when and where reflected energy arriving at a particular geophone actually entered the ground. The unlikelihood of securing usable records, added to the practical difficulty of placing and firing a charge in the manner disclosed, caused air-firing to be generally avoided in favor of shot hole firing during the period which has elapsed since issuance of the first McCollum patent in 1928.

A more recent reference to the firing of a charge in the air for seismic purposes appears to be the article entitled "Testing the application of air explosions in seismic reflection exploration" by A. A. Tsvetkov, appearing in the Russian periodical Applied Geophysics, in the issue of April 1, 1945. The author describes tests made in 1942 in which single concentrated charges 15 to 20 times greater than the charges used in shot holes were fired in the air at heights of 2 to 7 feet and reflections recorded by a seismograph located at such distance that the reflections of interest were recorded before the arrival of air waves. Similar use has been made of a large concentrated charge in this country from time to time over the past 20 years. For example, crews employing the shot hole method have encountered areas such as a swamp where drilling a shot hole was either difficult or impractical and have resorted to firing a large concentrated charge mounted on a fence post or similar support. Records obtained using this expedient have been extremely difficult to interpret because of a large amount of background noise and because of the presence of many multiple reflections making it impossible to pick out the true first reflections which are of interest. While firing a single concentrated charge may produce usable reflections in certain areas where results are easily obtained by more conventional methods, results are for the most part unpredictable. That is to say, there are many areas in which no reflections at all can be obtained where good records are obtainable using a conventional shot hole. For example, satisfactory records are not obtainable using the Russian method in regions where high velocity material, e. g. rock, extends practically to the surface as on the Edwards Plateau in western Texas. As a result there has been a complete failure to adopt this procedure in the place of shot hole firing.

With the above in mind, it is a general object of the present invention to provide a method and apparatus for seismic exploration which employs a novel pattern of air-fired charges spaced to cooperate with one another above the surface of the earth for applying an explosion wave to the earth over a broad but well defined area, to generate a seismic wave therein efficiently transmitted and which is for the most part directed straight down.

It is an object to provide a method and apparatus for seismic exploration in which the energy is largely concentrated in a relatively narrow band of frequencies rather than being uselessly dissipated over a wide band or spectrum. More particularly it is an object of the invention to provide a seismic set-up which is capable of producing clear, easily interpreted records which are not confused by the presence of vibrations resulting from background noise, ground roll, spurious reflections and the like. It is another object of the present invention to provide a novel seismic method which permits depth information to be taken with greater accuracy and consistency than is possible using a shot hole or other prior art method. It is a further object to provide seismic apparatus including pattern of charges which is capable of projecting a seismic impulse through the weathered layer with very little loss of signal strength, even through layers of loose dirt, sand, snow or other granular material difficult to penetrate by ordinary means.

It is another object of the present invention to provide a pattern of air-fired charges which is effective to set up an efficiently transmitted seismic wave but in which the size of the charge is much smaller than conventional charges and in which the energy is converted into an earth-borne wave without alteration of or damage to the earth's surface. It is a related object to provide an improved charge array in which the charges are not only smaller and less expensive than conventional charges but are also capable of being more easily and safely handled and set up for firing.

It is an object of the invention in one of its aspects to provide a seismic method and apparatus capable of beaming energy downwardly in the form of a composite wave front to obtain deep reflections of interest while causing the energy directed at a shallow angle to be largely self-cancelling. It is a related object of the invention to provide an improved seismic method and apparatus which substantially eliminates multiple reflections from shallow horizons.

It is still another object of the invention to provide an improved seismic set-up in which charges are fired in the air but in which confusion on the record caused by the air-borne wave front, which travels directly through the air from the charge to the recording instrument, is minimized.

It is an object of the invention in one of its aspects to provide an improved charge array which may be employed to produce a converging or focused wave front causing the explosive energy to be concentrated into a more clearly defined beam, thereby overcoming the tendency of the energy of the wave front to be spread or dissipated.

Furthermore, it is an object of the present invention to provide a seismic procedure which eliminates the necessity for drilling holes for placement of charges, which enables any number of shots to be fired in quick succession at a single station to produce a succession of identical or confirmatory traces and which enables the cost per oscillograph record to be reduced considerably below that which is incurred using conventional seismic techniques.

Other objects and advantages of the invention become apparent as the discussion proceeds, taken in connection with the accompanying drawings, in which:

Figure 1 shows a pattern of seven charges arranged above the earth in accordance with the present invention and equally spaced from one another.

Fig. 1a is a diagrammatic view illustrating a seismic set-up employing the present invention and showing the shot area and geophone spread.

Fig. 2 shows the manner in which the individual charges are mounted on poles above the earth.

Fig. 3 is an elevation showing the formation of a composite wave front upon firing the pattern of Fig. 1.

Fig. 4 illustrates the manner in which a generally concave composite wave front may be formed.

Fig. 5 shows the manner in which the absorption characteristics of the earth vary with amplitude of the transmitted wave for various sizes of particles.

Fig. 6 illustrates a typical deep reflection path together with multiple reflections from a shallow horizon.

Fig. 9 illustrates the use of a split spread.

Fig. 10 shows a typical reflection path employing a split spread.

Fig. 11 shows a seismic set-up employing multiple geophones in a split spread.

Figure 7:
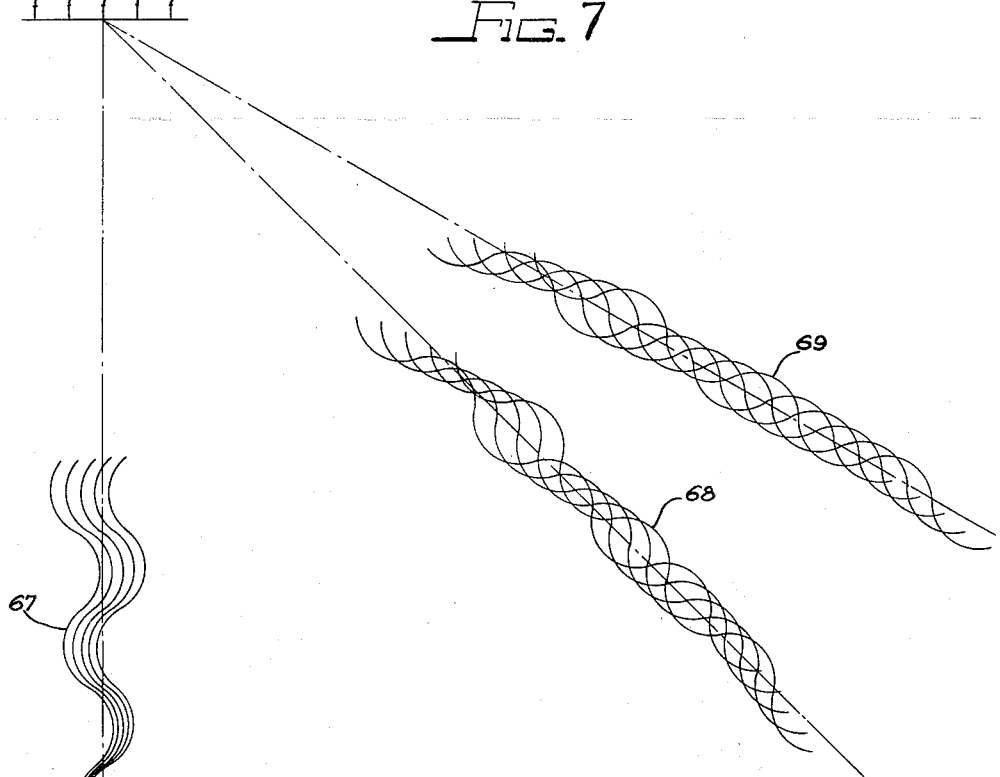
Fig. 7 illustrates the cancellation and reinforcement of the energy from the individual charges.

While the invention is susceptible of various modifications, I have shown in the drawings and will herein describe in detail only certain embodiments of the invention. It is to be understood, however, that I do not intend to limit the invention by such disclosure, but aim to cover all modifications and methods falling within the spirit and scope of the invention as expressed in the appended claims.

Referring to Figure 1, there is shown a charge array 20 which consists of a pattern of charges laterally spaced from one another and elevated the same distance above the ground. For simplicity, the showing is diagrammatic and the array will be seen to include seven charges 21–27 which are arranged in a hexagonal pattern, each charge being equally distant from neighboring charges. For detonating the charges each has a cap 29 (see Fig. 2), the caps being connected in series for simultaneous firing of the charges from a suitable current source 28.

The means preferably employed for supporting the charges above the ground is set forth in Fig. 2, the charge 21, for example, being mounted on a telescoping steel pole 30 and impaled on a light wooden dowel 31 mounted at the top of the pole. The dowel should be centered with respect to the charge, and where seismograph gelatin or other soft commercial explosive is employed, both cap and dowel may be easily pressed into place. The dowel 31 is supported by a short section of paper tubing 32. While both the dowel and the tubing are completely destroyed by the force of the blast, it has been found that the charges so mounted may be fired without any damage to the pole and without knocking it over or compressing it; as a result the same set of poles may be used over and over again and need only be lightly pressed into the earth when they are set up. It has been found that the pole offers no substantial obstruction to the passage of the supersonic explosion wave from the charge downwardly toward the ground. In order to minimize obstruction I prefer to employ a dowel which covers only a small fraction of the lower surface of the charge, as shown in Fig. 2.

Further in accordance with the present invention the charges should be arranged above the ground at such height that the wave striking the ground is still of supersonic velocity at the instant of impact, that is, of a velocity greater than the velocity of sound in air, which is approximately 1,000 feet per second. It will be appreciated by one skilled in the art that the velocity of the shock wave leaving an explosive charge when the same is detonated in air is normally many times the velocity of sound. As the wave is propagated downwardly from the charge the velocity tends to drop, first rapidly and then less rapidly as the distance from the charge is increased. My observations have shown that where the charges are mounted without substantial obstruction to the downwardly projected wave, the supersonic nature of the wave will be retained even though the charges are positioned up to 15 feet or more above the ground. I prefer, however, to arrange the charge pattern between approximately 5 and approximately 15 feet above the ground, which height may, for convenience, be referred to as "pole height."

With regard to lateral spacing the charges should be sufficiently close together so that they act cooperatively with one another to set up a seismic disturbance capable of being reflected from a submerged horizon and received at a geophone spread. In producing this cooperative action charges are exploded simultaneously over the shot area to set up a plurality of seismic waves in the earth in the regions below the respective charges, with the leading portions of the wave fronts being in phase or in "alinement" as they start their journey downwardly through the earth. It can be shown that even where relatively large spacing is used the alined seismic wave fronts tend to merge together during the course of travel to form a composite generally flat wave front which has substantial directive properties. On the other hand, the charges should be sufficiently far apart so that the composite wave front does not spread spherically in all directions as in the case of firing a single concentrated charge, but rather has a central portion of relatively high energy content which proceeds flatly toward a reflecting horizon. I prefer to employ a spacing between adjacent charges of about 10 to about 75 feet. In many regions it will be found that satisfactory records can be obtained using a spacing anywhere within the above range. In some areas it will be found more satisfactory to fire one or two preliminary shots at rather widely different spacings within the above range, using that which gives the clearest reflections. As will be more fully pointed out, preliminary or confirmatory shots may be reliably employed, since the nature of the earth as a conducting medium is not changed in any way between successive shots at a given shot area. In view of the fact that a pattern of charges can be positioned for firing by a trained crew in a matter of minutes, the cost is exceedingly small. However, when operating in more difficult areas and when maximum clarity of the record is desired, the charges may be so arranged and fired as to control with considerable accuracy the frequency of the seismic disturbance set up in the earth, as is covered in detail in my copending applications, as follows: Ser. No. 102,821, filed July 2, 1949; Ser. No. 102,822, filed July 2, 1949; and Ser. No. 102,823, filed July 2, 1949, all of which are continuations-in-part of application Ser. 29,307, which was filed May 26, 1948.

An example of a seismic set-up employing the present invention is to be found in Fig. 1a which shows both the shot area and the geophone spread. The charge array shown at 20 is the same as that disclosed in Fig. 1. The geophone spread 40 includes 12 or more geophones arranged in a line and each connected to a recording instrument 41. Preferably each of the geophones feeds into a separate channel so that a total of 12 to 24 traces will be produced in the recording instrument. The spacing between geophones is preferably on the order of 100 to 150 feet and the spread is offset from the shot point a sufficient distance so that all of the reflections of interest are received prior to the receipt of the direct air wave. In this figure and in the remaining figures the lines connecting the charges or geophones are for the purpose of making clear the geometric relation between them and do not represent electrical wiring which has been omitted for purposes of clarity. Except for the fact that the caps (and in a later section certain geophones) are connected in series, the wiring will be understood as conventional and as set forth in the various texts on seismic prospecting. Producing a time break, signalling the start of the seismic disturbance, is well within the capability of one skilled in the art. The start of the disturbance is of course determined by the arrival of the supersonic wave at the earth below one of the charges and any appropriate wave-sensitive device may be used for making the necessary indication on the seismogram.

The manner in which the composite wave front is formed in the earth may be more readily vistialized upon reference to Fig. 3. As mentioned above, each of the charges 21–25 in the pattern is at such height as to apply a wave of supersonic velocity, i. e., a shock wave, to the earth. Assuming that relatively concentrated charges are used, each shock wave is of greatest intensity over an area of the earth immediately surrounding the charge. The existence of a wave of supersonic velocity will be assured, assuming that each charge is mounted as described and within the range of elevation set forth above. Upon striking the earth the shock wave front is converted into a seismic wave front, the wave fronts being indicated at 21a–25a. These wave fronts are compressional in nature and are propagated downwardly at a velocity which is characteristic of the earth, being on the order of 8,000 to 12,000 feet per second in a dense medium and on the order of 2,000 to 6,000 feet per second where the surface layer is porous and heavily weathered. The variation in intensity in the wave front in Fig. 3 is roughly proportional to the denseness of the stippling. Although the wave fronts 21a–25a are separate at the time that they are set up in the earth, the fact that all of the charges are fired at the same time causes them to be substantially in horizontal alinement, that is to say, in step with another in the downward direction.

It is naturally somewhat difficult to describe accurately the transformation of the alined wave fronts 21a–25a as they proceed downwardly through the earth. It is, however, indicated from the observations which I have made and from the nature of the records which have been obtained that the wave fronts keep in step with one another and appear to form a unitary disturbance which can be described by the term "composite seismic wave front." It would seem that the individual wave fronts spread out laterally to at least a limited degree so that they practically touch one another as indicated at 21b–25b. Observations indicate that as the wave fronts progress more deeply into the ground the openings between the wave fronts tend to fill in rather completely, producing a merged wave front indicated generally at 45 and having sections 21c–25c. This wave front has no sharp discontinuity at the periphery, neither does it fan out in all directions. Instead, the energy is concentrated for the most part into a slightly divergent beam which has a substantial amount of directivity. After reflection from a submerged reflecting horizon the wave front rebounds toward the geophone spread 49. Provided that the submerged horizon is substantially horizontal, the reflected wave front will strike all of the geophones either at the same time or in rapid succession to produce an "alinement" on the record. Where substantial amounts of dip are present there will be a characteristic stepout between the adjacent geophone traces.

If desired, to reduce somewhat the amount of fringing or dispersion of the energy in the wave front, the center charge of the pattern indicated at 23 in Figs. 1 and 3 may be elevated slightly above the height of the remainder of the charges to the position 23'. This causes the airborne wave front from the central charge to be elevated a corresponding amount relative to the remainder of the individual wave fronts and tends to produce a slightly concave or focused seismic wave front as indicated at 45a in Fig. 4. The degree of elevation of the central charge under such circumstances is not critical and may be readily determined by one skilled in the art based upon knowledge of the velocity of the wave in the air and in the ground, the depth of the concavity being equal to the velocity of the seismic wave multiplied by the delay time. If desired the concavity may be confirmed by employing a pattern of geophones or pressure detectors buried below the charges, with arrival of the wave fronts at each detector recorded by any suitable high speed recording apparatus. As an alternative procedure the height of the charge 23' may be varied slightly between several successive shots taken for the same location of shot area and geophones and the most favorable record selected from the group.

While Fig. 4 serves to illustrate one of the rather unique possibilities of the method, it is a refinement which will not be found necessary in normal field use. Arranging charges at the same height and firing them simultaneously has the advantage of extreme simplicity and has been the procedure normally employed to obtain results even in difficult "no record" areas. An important thing to observe in both Figs. 3 and 4 is that the composite seismic wave front is relatively flat. Under normal conditions with average weathering it has been determined by actual measurement that there is substantial directivity or beaming brought about by my charge arrangement, as much as 85 percent of the energy in the earth being included within a cone of less than 90 degrees. Where there is very little weathering and high velocity material extends practically to the surface, the directivity is even greater, 85 percent of the seismic energy being included within a cone of 30 degrees centered below the charge pattern.

Studies have been made in an endeavor to determine the reason for the efficient transmission of the explosive energy to the earth and the reasons which enable the seismic wave to be effectively projected to great depths and reflected to the geophone spread. One of the important factors in the success of the present procedures is believed to be the relatively low level of intensity at which the seismic wave is generated in the surface of the earth. It will be recalled that common practice requires the drilling of shot holes varying in depth from 30 to about 300 feet in order that the charge might be exploded below the loose weathered layer. This practice has been dictated by experience, since the setting off of charges in the weathered layer ordinarily results in much poorer records than where deep shot holes are used. This is also true where charges are fired in contact with the surface of the earth or in very shallow holes or trenches. By way of contrast, the present invention utilizes a plurality of charges fired well above the surface. The explosive energy thus starts on its journey under very different circumstances. Observations indicate that the energy of the blast is absorbed and transmitted elastically by the air. In addition, the wave spreads out more or less spherically in the air as it proceeds in the direction of the ground so that the intensity is reduced below the level which causes crushing of earth structure. Although the energy level is low, the supersonic wave strikes the ground over a relatively large circular area under the charge over which the intensity is reasonably constant. Using charges within the range of one ounce to ten pounds or more elevated above the ground at pole height, it is found that the energy level is sufficiently low so that there is no destruction at the surface and very little damage to the plant life, even directly under the charges.

Efficient transmission of the seismic wave set up at the surface is believed due to the fact that the procedures disclosed herein inherently make valuable use of certain transmission properties of the granular materials of which the weathered layer is composed. Confirmatory studies have indicated that the energy absorption by granules of various sizes is not the same and that the degree of absorption in the earth varies in a rather unique way with the amplitude or intensity of the seismic wave being transmitted. Fig. 5 shows two typical absorption curves applicable to frequencies normally encountered in seismic work, the curve 50 being applicable to sand and the curve 51 being applicable to coarse gravel. It will be noted in this figure that considerable absorption of seismic energy occurs over a wide range of amplitude and it is only at very low amplitudes that absorption is low so that transmission of the seismic wave takes place efficiently. Since the curves are offset from one another the net or over-all characteristic for such a mixture as the weathered layer will be approximately the envelop of a family of such curves, the effect being to further broaden the range of amplitude at which absorption is excessive.

The above becomes significant when it is recalled that previous attempts to penetrate the poorly transmitting layers have depended primarily upon brute force and it is generally observed that the use of larger hole charges results in records which are slightly improved. In accordance with the present invention, and by way of contrast, efficiency of transmission has been obtained by decreasing and not increasing the amplitude of the seismic pulse applied to the earth at the shot point. Transmission thus takes place in the flat left-hand region of the curve where transmission is much favorable. Note, however, that employing a low energy level does not reduce the amount of useful shock wave energy imparted to the earth. The increased area acted upon by the charges 21–27 acting in concert is sufficiently great so as to more than make up for the decrease in amplitude and the amount of total energy put into the earth is therefore high. As a rough measure of such energy it has been found that the earth is acted upon over the area of the pattern by a force in excess of 1,000,000 pounds for each pound of explosive employed.

Further studies have been made in order to confirm the importance of using a plurality of laterally spaced charges to deliver an impact to the earth which is of supersonic velocity. It can be demonstrated that the efficiency of conversion of an airborne wave to a more dense medium is a direct function not only of the velocity of the wave in the air but also of the density of the air. It has already been stated that the velocity of the supersonic wave is preferably several times that of a sound wave which, of itself, tends to produce efficient energy conversion. It is not so generally appreciated that the air in a shock wave front is highly compressed and has a much higher density than air at atmospheric pressure. The result is a disproportionate increase in conversion efficiency over the area of the charge pattern or shot area. Almost equally important is the fact that the rapid drop-off in the velocity of the airborne wave outside of the pattern to sonic velocity causes very poor conversion at points outside of the region covered by the pattern. Consequently, it can be stated that the explosion of a pattern of charges as described herein causes a seismic wave to be set up only over a rather well defined area.

Having efficiently penetrated the weathered layer, the seismic wave front has successfully passed the first and most difficult "hurdle." The wave retains sufficient energy to enable it to penetrate to great depths and to persist at reliable recording intensities until the surface of the earth is reached at the end of the reflection path. Sand or gravel layers either at considerable depths or weathered layers at the point of reception do not constitute as much of a barrier as weathered layers at the shot area, since the intensity of the seismic wave is by this time well below the range at which excessive absorption takes place.

It will be clear from the above that the use of the present charge arrays enables a maximum of explosive energy to be available at the geophones for the tracing of useful records. My studies have shown that there are a number of other advantages which are less obvious but nonetheless important and which are due to the use of separate charges in the shot pattern. Prior to discussing such additional advantages, it will be well to keep in mind that it is really the signal-to-noise ratio and the freedom from spurious reflection which is of primary importance in the production of clear and easily interpreted seismic records. Most of the so-called "no record" areas are so considered not because the seismic signal is attenuated very rapidly but rather because the signal-to-noise ratio is unfavorable. The two features of the improved charge array which contribute to the readability of the records will, for the sake of simplicity, be considered as separate although it will be understood by one skilled in the art that the effects are closely related. They have to do first with the energy distribution in the seismic wave front, and secondly with the self-cancelling effect which occurs in connection with laterally directed energy and especially the shallow reflections produced thereby.

With regard to distribution of energy, reference is made to Fig. 6 in which the charge pattern 20 is shown on a much reduced scale. The directivity of the seismic energy is indicated in this figure by the "cone of maximum intensity" indicated by the dotted lines at 55. Assuming that the high velocity medium extends close to the surface, such cone will include 85 percent of the seismic energy within a conical angle of 30 degrees. The intensity varies within the cone, being largely concentrated within the central 20 degrees and particularly along the vertical axis. The high degree of concentration along the axis of the pattern is due in part to the fact that the seismic disturbance is set up by fluid pressure which can act only at right angles to the surface of the ground, that is to say, straight down.

The path of the main reflection is indicated at 56 and lies well within the maximum energy cone. After striking the submerged horizon 46, reflection occurs along the return path 57 leading to the geophone spread. Some seismic energy will, of course, be directed off at an angle as indicated at 60, and will be reflected from a shallow horizon 61 (which may, for example, be only 800 feet or so in depth) and returned to the geophone along a path 62. Such energy in such path will be at a very low level since the path lies outside of the maximum energy cone. Still other seismic energy will be directed along the path 64 and will suffer an additional reflection at the surface of the earth 65 before arriving at the geophone spread over a path 66. In short, all shallow reflections, not of interest, and whether single or multiple, will inherently arrive at the geophone spread at a low amplitude.

This brings us to the second factor which substantially contributes to the low level of the extraneous vibrations, namely the self-cancelling effect. In considering this effect it will be helpful to keep in mind that the seismic wave produced by the air-fired charges acting in unison is the resultant of the wave set up by each of the charges except where extremely close spacing of the changes is employed. It will also be helpful to remember that the seismic wave is not a single abrupt wave front but is a short wave train or pulse. Consequently it is possible to diagrammatically represent the seismic disturbance resulting from each of the charges by individual time-pressure curves. This has been done in Fig. 7. If we first focus attention on the region directly below the charge pattern it will be seen that all the time-pressure curves are in phase with one another as indicated at 67. For the sake of simplicity only 5 of the curves have been shown. Since the pressure is "in phase" and since the selected position is at the center of the intensity cone, it is apparent that the resultant pressure may be of relatively high amplitude. However, if we consider the energy which is projected more or less laterally from the same shot, the curves, indicated at 68, are no longer in phase but tend to cancel one another out to a large extent. If we direct our attention to a still shallower angle, the pressure-time curves, as indicated at 69, are out of phase to an even greater degree and there is substantially complete cancellation. It will therefore be apparent that the shallow reflections produced by the laterally directed energy, as well as the seismic waves which pass through the surface of the earth directly from shot point to geophone without reflection, will be at a very low level.

To summarize our observations in Figs. 6 and 7 it will be apparent that a composite wave front of high intensity is projected straight down to produce reflections from the deeper horizons of interest. The seismic disturbances which proceed laterally away from the shot point and which cause the multiple shallow reflections and background noise on the other hand, are not in the form of composite wave fronts since the waves set up by the individual charges are out of time phase. Furthermore, such laterally directed energy is at a very low intensity since it proceeds in a direction which makes a relatively small angle with the surface of the earth while the fluid pressure from the explosion can only act perpendicularly to the surface.

In order to enhance the cancellation effect, I found it advisable to orient the charge pattern so that the charges thereof are located at a maximum number of different distances from the geophone spread. Thus, it will be apparent that with the hexagonal pattern with one corner directed toward the geophone spread, the charges will be effectively located at five different distances, the only alinement occurring between charges 22, 27 and 24, 26. If desired, further improvement may be secured by rotating the pattern a slight additional amount so that the 7 charges are each located at a different distance.

Figure 8:
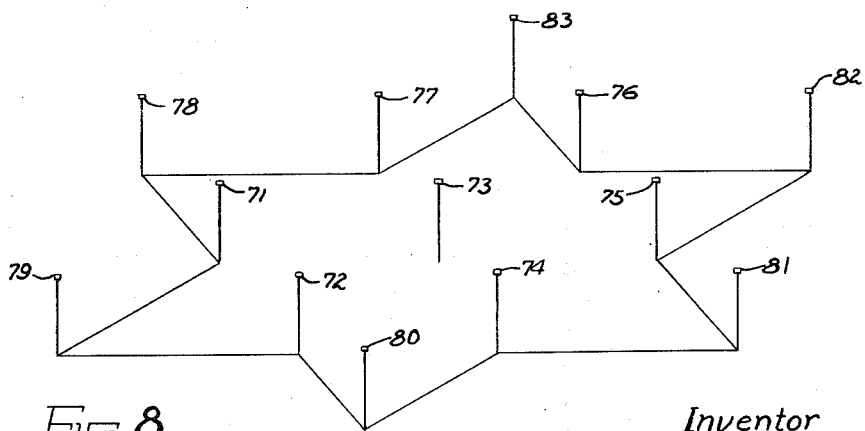
Fig. 8 is a perspective of a star pattern.

If desired, further improvement may be secured by using a star pattern of 13 charges rather than the hexagonal pattern of 7. Such a pattern is shown in Fig. 8, the charges being designated 71–83. When employing a star pattern, the effect is almost exactly the same as discussed in connection with Fig. 3, except that a composite wave front will consist of a correspondingly larger number of individually formed wave fronts. A star pattern will normally cover a broader pattern and may use a greater total amount of explosive. However, in regions where reflections are more readily obtained, the amount of explosive can be reduced in each charge so that the total remains the same. It will be apparent that the cancellation effect described above is greater using a larger number of charges, and the star pattern may be oriented so that the charges are at a total of 13 different distances away from the geophone spread. The disadvantage of using a more involved pattern is that additional time is required in setting up a shot. While patterns of 7 and 13 charges are preferred it will be apparent to one skilled in this art that the invention is not so limited but will include other patterns employing a plurality of charges within approximately the range of elevation specified and where they cooperate in the novel fashion herein disclosed.

*Embodiment employing split spread*

The invention has been discussed above both generally and in connection with an offset spread in which the geophones are located at some distance, for example a half mile or more, from the shot point. My studies have shown that while this arrangement produces satisfactory records in normal areas, greatly improved results may be obtained in more difficult areas by using geophones located in the immediate vicinity of the shot point so that the air wave is received and the effect thereof dissipated prior to the arrival of the reflections of interest. Referring to Fig. 9 a seismic set-up is disclosed in which the charge pattern indicated at 89 is in the middle of a split spread 90. Such spread may consist of a total of 12 or more geophone receiving stations 91–102, inclusive, which are spaced 100 to 150 feet apart. Each of the receiving stations feeds into one channel of a recording instrument 103 so that a total of 12 or more traces are produced. I have found that improved results are secured with this arrangement on the Edwards plateau in Texas, and also in southern Florida where it has been previously considered impossible to use reflection seismic techniques successfully. The reason for the improved results in such difficult areas is believed due to the fact that the high velocity material extends practically to the surface of the earth thereby producing a cone of maximum intensity which is considerably narrower and more well defined than that which is observed in areas of greater weathering. Reference is made to Fig. 10, which is on a scale similar to that of Fig. 6, and in which the cone of intensity is indicated at 105. Upon firing of the charge pattern the energy is directed or beamed along a path 110 and is directly reflected from a deep horizon 111 into the region of the shot. Consequently energy is picked up at the geophone spread 90 at a relatively high level whereas the energy at an offset point, for example a half mile or more away, is at a considerably lower level. As a result records are obtained at the spread 90 which are unobtainable using a conventional shot hole and which may also be unobtainable employing an air-fired charge pattern with offset spread.

It might be expected that where the geophones are located so close to the shot point the entire record would be obscured by the direct impact of the air wave on such geophones. It is found, however, that the air wave disturbance is only minor and that its effects are not lasting, permitting the reception of relatively shallow usable reflections. The reason for this is believed twofold. In the first place, where a split spread is used the total charge may be extremely small, on the order of 2 pounds. Since this total is split up, this amounts to only about 5 ounces per charge. A factor causing still further reduction in the intensity of the air wave is that the compression waves from the individual charges, and which proceed parallel to the ground, arrive at a given geophone out of time phase and consequently tend to neutralize or cancel one another. The transient disturbance is therefore quite minor and does not tend to persist after the final wave front in the air wave has been received. Specifically, my observations have shown that the effect of the direct air wave does not interfere with reflections at greater than about .05 of a second beyond the time that the direct air wave passes the last geophone corresponding in general to an elapsed time of 0.7 second to 0.8 second on the record. Most useful reflections do not arrive until much later.

*Embodiment employing multiple geophones*

In certain especially difficult areas which have refused to yield useful records by ordinary seismic means, a modified seismic set-up may be usefully employed along the lines illustrated in Fig. 11. The arrangement is generally similar to that shown in Fig. 9, except that each of the receiving stations, here indicated as 91a—102a, is formed of multiple geophones arranged in line at right angles to the direction of the shot point. If desired, 9 geophones may be used in each line connected in a series parallel combination consisting of 3 groups of 3. Individual geophones are spaced from approximately 6 to approximately 10 feet from one another. For ease in placement, such geophones may be of the lightweight type having an integral spike for anchoring them to the earth and put into position merely by pressing with the foot and without the necessity for digging a hole. Each station of geophones thus connected feeds into a single channel in the recording instrument so that the resulting trace represents an average over a distance of approximately 90 feet.

It is believed that the success of this arrangement in difficult areas is due to the fact that there may be a great variation in velocity at the immediate surface, especially where the high velocity rock structure at the surface is broken up or disjointed, as is the case on the Edwards plateau. Where the disjointed pieces of rock are large, it appears that energy is not transmitted to the geophones at right angles to the earth, but tends to follow the veins of high velocity medium, for example limestone, through a rather tortuous path. The energy is transmitted with difficulty across the discontinuities at the breaks in the limestone. This results in an appreciable difference in path distances for energy arriving at two adjacent geophones. Tests have shown that adjacent geophones located as close as 6 feet may produce a different indication of depth because of the unlike transit time. By using a large number of geophones, for example, 9, spaced on the order of 10 feet apart, a satisfactory averaging effect is achieved, and the resulting trace is substantially the same as if the seismic wave had been transmitted through a homogeneous medium.

One of the additional advantages in using the multiple geophone set-up shown in Fig. 11 is that any tendency toward false reflections as a result of air echo is substantially eliminated. Even where such echoes do occur they are usually very easily spotted because of the excessive stepout between the traces. It will be apparent that where multiple geophones are used at each receiving station, any echo will arrive at the successive geophones out of phase and the effect will therefore be averaged out and will not be recorded at all.

The improved results to be obtained using a pattern of charges in the manner described above have been verified by extensive field usage and the phenomena associated therewith such as reduction in background noise, and reduction in sprious and multiple reflections may be explained along the lines already suggested. Continuing studies indicate, however, that there are still additional reasons for the improved result. In the preceding discussion mention was made of the difficulties involved in obtaining consistent records in areas such as the Edwards plateau where broken high velocity material such as limestone extends practically to the surface of the earth. It is believed that the present charge array makes use of a novel averaging effect for projecting a relatively flat seismic wave through broken high velocity material. It can be shown, as indicated above, that the transmission characteristics may be quite widely different at 2 points on the earth which are separated as little as 7 to 10 feet, that the seismic waves terminating or beginning in such points may follow paths which are of such different length that the seismic waves are thrown out of phase. It is clear, therefore, that whenever explosive energy originates at a single point the record which is obtained may be considerably different from that which originates at a point a relatively short distance removed. Using the procedures outlined herein the charge pattern covers a considerable area and the seismic wave cannot therefore follow a high velocity path or a low velocity path exclusively. Instead, the transfer of explosive energy to the earth takes place over an average path and error due to incorrect placement of the shot point are substantially eliminated. Since an accurate average velocity, determined by experiment, is used in the depth calculations, over-all accuracy in determination of the depth of reflected horizons by the use of present procedures is assured.

While the area covered by the charge pattern may be quite broad, on the order of 200 to 300 feet in diameter, nevertheless such area is well defined as compared to the areas acted upon by the seismic waves when using prior seismic techniques. The energy is sufficiently concentrated into a beam so that the wave may be directed to a relatively small section of a submerged horizon. Thus, accurate data may be separately obtained on either of two offset portions of a faulted stratum and detailed logging is possible.

It will be apparent from the foregoing that the present charge array and manner of use enables the obtaining of seismic records with great economy even in difficult areas where the use of more conventional arrangements is unsatisfactory or impractical. The elimination of shot holes is of particular advantage in parts of the country or in remote sections of foreign countries where the shot point is difficult of access or where the shot hole must penetrate layers of hard rock. The saving of time is even greater than might be supposed since redrilling after firing a shot is unnecessary. By way of contrast a large number of shots may be made at a given shot point using the present procedures without damage to the earth and with only insignificant damage to vegetation. Even the poles are unaffected and do not have to be set up between shots. Where the land is owned by others it is frequently necessary to pay large fees for the privilege of seismic shooting primarily to compensate the owner for damage done by transporting and installing heavy drill rigs. Using the present array objections on the part of the land owner are eliminated and the fee is substantially reduced.

In spite of the fact that the charges are exploded in the air, the use of the present array is safe for both personnel and surrounding structures of masonry or the like. As regards personnel, there is an absence of any flying missiles since the charge is completely disintegrated and the supporting poles are not affected. Since low frequency ground roll is minimized, there is no danger of cracking foundations, watering tanks, and the like, or of damaging water wells.

Due to the small amount of energy imparted to each unit of surface the present procedures are adaptable to water covered areas. During recent years extensive surveys have been made in coastal waters and off-shore oil fields are becoming increasingly important. The detonation of charges above the water has the advantage that fish and other underwater life having large commercial value are not harmed in any way.

The procedures outlined herein are also eminently suited for taking measurements of the depth of snow and ice layers or in obtaining geological information where there is an overburden of snow to a depth of several hundred feet. In the Antarctic it was found that large charges buried in the snow were practically useless for obtaining good reflections both because the energy is absorbed by the crushing of snow and ice, and even more importantly by the fact that the snow serves as an extremely effective condenser for the hot gases resulting from the explosion. Using present techniques, soundings have been made through deep snow to basement rock using charges weighing only a few ounces.

In the following claims the term "laterally spaced charges" will be understood to mean charges horizontally spaced from one another so that they can act cooperatively in setting up a seismic disturbance. It will be further understood that the step of "detecting" includes within its scope the picking up of the seismic impulse by means of geophones or the like and amplifying and recording it in the conventional manner.

This application is a continuation-in-part of my copending applications Ser. 29,307 filed May 26, 1948, and Ser. 102,823 filed July 2, 1949.

I claim as my invention:

1. The method of seismic exploration which includes the steps of supporting a plurality of charges above the surface of the ground laterally spaced from one another to define an area and at substantially the same height, each of said charges being free of substantial obstruction to the passage of a supersonic wave downwardly therefrom, said charges being located at such height as to apply supersonic waves to the ground below the respective charges and said charges being laterally spaced from one another at such distance that the seismic waves resulting from the supersonic waves form a composite seismic wave front upon passage through the earth, exploding said charges simultaneously to project said composite wave toward a reflecting horizon, and detecting the seismic wave after reflection of the same from said horizon.

2. Seismic apparatus for geophysical prospecting which comprises in combination a plurality of explosive charges, means for supporting the charges elevated above the ground and spaced from one another over a shot area with the charges being free of substantial obstruction to the passage of a supersonic wave downwardly from each of them, said charges being so elevated from the ground that the waves from the charges are still of supersonic velocity when they strike the ground, means for firing the charges so that said waves strike the ground substantially simultaneously for the setting up of generally alined seismic waves under the respective charges, means including geophones for detecting the resulting seismic wave after reflection from a submerged horizon, said charges being distributed over the shot area in a two dimensional pattern.

3. Apparatus in accordance with claim 2 in which the charge supporting means for each of the charges includes a metallic pole having an expendable tip engaging the associated charge and centrally alined therewith.

4. Seismic apparatus for geophysical prospecting which comprises in combination a plurality of explosive charges, means for supporting the charges elevated above the ground and spaced from one another over a shot area with the charges being free of substantial obstruction to the passage of a supersonic wave downwardly from each of them, said charges being so elevated from the ground that the waves from the charges are still of supersonic velocity when they strike the ground, means for firing the charges so that said waves strike the ground substantially simultaneously for the setting up of generally alined seismic waves under the respective charges, means including geophones for detecting the resulting seismic wave after reflection from a submerged horizon, said charges being arranged in a two dimensional pattern in which each of the charges is spaced at substantially the same distance from its neighboring charges.

5. Seismic apparatus for geophysical prospecting which comprises in combination a plurality of explosive charges, means for supporting the charges elevated from above the ground and spaced from one another over a shot area with the charges being free of substantial obstruction to the passage of a supersonic wave downwardly from each of them, said charges being so elevated from the ground that the waves from the charges are still of supersonic velocity when they strike the ground, means for firing the charges so that said waves strike the ground substantially simultaneously for the setting up of generally alined seismic waves under the respective charges, means including geophones for detecting the resulting seismic wave after reflection from a submerged horizon, said charges being arranged in a hexagonal pattern with equal distance between adjacent charges throughout the pattern.

6. Seismic apparatus for geophysical prospecting which comprises in combination a plurality of explosive charges, means for supporting the charges elevated above the ground and spaced from one another over a shot area with the charges being free of substantial obstruction to the passage of a supersonic wave downwardly from each of them, said charges being so elevated from the ground that the waves from the charges are still of supersonic velocity when they strike the ground, means for firing the charges so that said waves strike the ground substantially simultaneously for the setting up of generally alined seismic waves under the respective charges, a geophone spread having laterally spaced geophones distributed in alinement in opposite sides of the shot area and extending outwardly from a position immediately adjacent thereto, and means for recording the signals from the respective geophones.

7. Seismic apparatus for geophysical prospecting which comprises in combination a plurality of explosive charges, means for supporting the charges elevated above the ground and spaced from one another over a shot area with the charges being free of substantial obstruction to the passage of a supersonic wave downwardly from each of them, said charges being so elevated from the ground that the waves from the charges are still of supersonic velocity when they strike the ground, means for firing the charges so that said waves strike the ground substantially simultaneously for the setting up of generally alined seismic waves under the respective charges, a geophone spread having geophones arranged in spaced groups in alinement on opposite sides of the shot area and extending outwardly from a position immediately adjacent said shot area, and means for recording the signals from the respective groups.

THOMAS C. POULTER.

REFERENCES CITED

The following references are of record in the file of this patent:

UNITED STATES PATENTS

| Number | Name | Date |
| --- | --- | --- |
| Re. 17,242 | McCollum | Mar. 19, 1929 |
| 1,509,208 | Hull | Sept. 23, 1924 |
| 2,064,451 | Voorhees | Dec. 15, 1936 |
| 2,232,613 | Klipsch | Feb. 18, 1941 |
| 2,340,314 | Farnham | Feb. 1, 1944 |
| 2,379,203 | Vertzinsky | June 26, 1945 |

FOREIGN PATENTS

| Number | Country | Date |
| --- | --- | --- |
| 701,747 | France | Mar. 21, 1931 |

OTHER REFERENCES

Tsvetaev, "An Experiment of Application of Air Explosives." Article in "Applied Physics," U. S. S. R., April 1, 1945, pages 82–87.